United States Patent
Tanaka

(10) Patent No.: US 12,434,868 B2
(45) Date of Patent: Oct. 7, 2025

(54) MOBILE BODY, METHOD OF CONTROLLING MOBILE BODY, PROGRAM OF CONTROLLING MOBILE BODY, AND ELECTRIC POWER SUPPLY SYSTEM

(71) Applicant: Sony Group Corporation, Tokyo (JP)

(72) Inventor: Hirotaka Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 520 days.

(21) Appl. No.: 17/999,405

(22) PCT Filed: Apr. 13, 2021

(86) PCT No.: PCT/JP2021/015279
§ 371 (c)(1),
(2) Date: Nov. 21, 2022

(87) PCT Pub. No.: WO2021/241041
PCT Pub. Date: Dec. 2, 2021

(65) Prior Publication Data
US 2023/0234731 A1  Jul. 27, 2023

(30) Foreign Application Priority Data
May 29, 2020 (JP) .................. 2020-095046

(51) Int. Cl.
*B64U 50/30* (2023.01)
*B64U 10/14* (2023.01)
(Continued)

(52) U.S. Cl.
CPC ............. *B64U 50/30* (2023.01); *B64U 50/19* (2023.01); *H01M 10/613* (2015.04);
(Continued)

(58) Field of Classification Search
CPC ........ B64U 50/30; B64U 50/19; B64U 10/14; B64U 30/20; B64U 2101/30;
(Continued)

(56) References Cited

U.S. PATENT DOCUMENTS 5,809,785 A  * 9/1998 Polkinghorne ........ H10N 10/13
62/3.2
6,226,994 B1 * 5/2001 Yamada ................. H10N 10/17
136/203

(Continued)

FOREIGN PATENT DOCUMENTS

CN  104040783 A  9/2014
CN  109075408 A  12/2018
(Continued)

OTHER PUBLICATIONS

International Search Report and Written Opinion mailed on Jun. 29, 2021, received for PCT Application PCT/JP2021/015279, filed on Apr. 13, 2021, 9 pages including English Translation.

*Primary Examiner* — Len Tran
*Assistant Examiner* — Gustavo A Hincapie Serna
(74) *Attorney, Agent, or Firm* — XSENSUS LLP

(57) ABSTRACT

Heating a battery and cooling an electric power conversion device are achieved together. This mobile body includes an electric motor, a battery, a thermoelectric conversion element, an electric power conversion device, and a controller. The electric motor is a driving source. The electric power conversion device is configured to convert electric power outputted from the battery into driving electric power for the electric motor. The electric power conversion device is disposed in direct contact or in indirect contact with the battery with the thermoelectric conversion element interposed therebetween. The controller is configured to control electric power to be supplied to the thermoelectric conversion element. The controller controls, in a case where the (Continued)

battery is in a predetermined low-temperature state, the electric power to be supplied to the thermoelectric conversion element to cause a surface of the thermoelectric conversion element coupled to the battery to serve as a heat dissipation surface.

11 Claims, 6 Drawing Sheets

(51) Int. Cl.
    *B64U 30/20*     (2023.01)
    *B64U 50/19*     (2023.01)
    *B64U 101/30*     (2023.01)
    *H01M 10/613*     (2014.01)
    *H01M 10/625*     (2014.01)
    *H01M 10/6563*     (2014.01)

(52) U.S. Cl.
    CPC ........... *H01M 10/625* (2015.04); *B64U 10/14* (2023.01); *B64U 30/20* (2023.01); *B64U 2101/30* (2023.01); *B64U 2201/20* (2023.01); *H01M 10/6563* (2015.04); *H01M 2220/20* (2013.01)

(58) Field of Classification Search
    CPC . B64U 2201/20; B64U 30/21; H01M 10/613; H01M 10/625; H01M 10/6563; H01M 2220/20; H01M 10/44; H01M 10/486; H01M 50/249; H01M 10/6572; B64C 39/024
    USPC .......................................................... 165/287
    See application file for complete search history.

(56) References Cited

U.S. PATENT DOCUMENTS

| | | | | |
|---|---|---|---|---|
| 7,024,865 | B2* | 4/2006 | Tateyama | H10N 10/813 62/3.7 |
| 8,377,581 | B2* | 2/2013 | Anderson | H01M 10/6572 429/62 |
| 9,572,552 | B1* | 2/2017 | Bodor | H01M 10/613 |
| 10,236,488 | B2* | 3/2019 | Li | H01M 50/30 |
| 2008/0311466 | A1* | 12/2008 | Yang | H01M 10/6572 429/62 |
| 2015/0007583 | A1* | 1/2015 | Murata | B60L 3/003 62/3.2 |
| 2016/0181835 | A1* | 6/2016 | Gross | H01M 10/658 320/101 |
| 2017/0110775 | A1* | 4/2017 | Smith | H01M 10/613 |
| 2017/0284709 | A1* | 10/2017 | Hirsch | H01M 10/486 |
| 2018/0166621 | A1* | 6/2018 | Ranalli | H01M 10/6572 |
| 2018/0175271 | A1* | 6/2018 | McBride | H01M 10/6572 |
| 2018/0209748 | A1* | 7/2018 | Thomas | H01M 10/6572 |
| 2018/0248101 | A1* | 8/2018 | Pierce | H10N 19/101 |
| 2018/0313584 | A1* | 11/2018 | Henke | H01M 10/6556 |
| 2019/0020081 | A1* | 1/2019 | Spillner | H01M 10/6554 |
| 2019/0140327 | A1* | 5/2019 | Fukada | H01M 50/24 |
| 2020/0031242 | A1* | 1/2020 | Thomas | H01L 23/38 |
| 2020/0161881 | A1* | 5/2020 | Ahmed | H02J 7/0042 |
| 2020/0313258 | A1* | 10/2020 | Hsieh | B60L 58/27 |
| 2020/0406776 | A1* | 12/2020 | Mihara | H02P 9/04 |
| 2021/0257693 | A1* | 8/2021 | Lee | H01M 50/569 |
| 2022/0158274 | A1* | 5/2022 | Peron | H01M 10/635 |

FOREIGN PATENT DOCUMENTS

| | | | | |
|---|---|---|---|---|
| EP | 2567424 B1 | * | 8/2015 | ............ H01G 11/10 |
| JP | 2008-103108 A | | 5/2008 | |
| JP | 2010168925 A | * | 8/2010 | |
| JP | 2013110897 A | * | 6/2013 | |
| JP | 2014-209809 A | | 11/2014 | |
| JP | 2016220295 A | * | 12/2016 | |
| JP | 2017-195104 A | | 10/2017 | |
| JP | 6545247 B1 | | 7/2019 | |
| KR | 101734717 B1 | * | 5/2017 | .......... H01M 10/486 |
| WO | WO-2013011958 A1 | * | 1/2013 | ........ H01M 10/6551 |
| WO | 2013/105152 A1 | | 7/2013 | |
| WO | 2017/183429 A1 | | 10/2017 | |
| WO | WO-2017216691 A1 | * | 12/2017 | .............. B64C 7/00 |
| WO | 2019/130703 A1 | | 7/2019 | |
| WO | WO-2019166733 A1 | * | 9/2019 | ............ B60L 3/0046 |

* cited by examiner

MOBILE BODY, METHOD OF CONTROLLING MOBILE BODY, PROGRAM OF CONTROLLING MOBILE BODY, AND ELECTRIC POWER SUPPLY SYSTEM

CROSS-REFERENCE TO RELATED APPLICATIONS

The present application is based on PCT filing PCT/JP2021/015279, filed Apr. 13, 2021, which claims priority to Japanese Application No. 2020-095046, filed May 29, 2020, the entire contents of each are incorporated herein by reference.

TECHNICAL FIELD

The present disclosure relates to a mobile body, a method of controlling a mobile body, a program of controlling a mobile body, and an electric power supply system.

BACKGROUND ART

Secondary batteries such as lithium-ion batteries are temperature-dependent in terms of an operation. Due to such temperature dependence, in a low-temperature environment, chemical reactions related to charging and discharging become slow, which decreases charging and discharging efficiency of the battery. Meanwhile, in a high-temperature environment, high charging and discharging efficiency is obtainable; however, a self-discharge amount of the battery increases, which markedly reduces remaining capacity. Addressing the decrease in the charging and discharging efficiency of the battery, PTL 1 discloses a battery heat retention system that includes a radiator in a path of cooling water circulating between an inverter and a charger, and an electric heater configured to heat a secondary battery of a battery unit.

CITATION LIST

Patent Literature

PTL 1: Japanese Unexamined Patent Application Publication No.

SUMMARY OF THE INVENTION

However, in a heat retention system described in PTL 1, an electric heater is used exclusively for heating a battery. Therefore, in a case where the battery and an inverter are disposed close to each other, it is difficult to sufficiently suppress heat transfer from the electric heater to the inverter, which may result in heating of the inverter that, in fact, requires cooling. In relatively small-sized mobile bodies such as drones and flight robots, it is often required to dispose the battery and an electric power conversion device such as an inverter close to each other due to limitations on mounting spaces for the battery and peripheral equipment thereof.

It is an object of the present disclosure to provide a mobile body, a method of controlling a mobile body, a program of controlling a mobile body, and an electric power supply system taking into consideration the above-described issue.

A mobile body according to an embodiment of the present disclosure is a mobile body that includes an electric motor, a battery, a thermoelectric conversion element, an electric power conversion device, and a controller. The electric motor is a driving source. The electric power conversion device is configured to convert electric power outputted from the battery into driving electric power for the electric motor. The electric power conversion device is disposed in direct contact or in indirect contact with the battery with the thermoelectric conversion element interposed therebetween. The controller is configured to control electric power to be supplied to the thermoelectric conversion element. In the present embodiment, the controller controls, in a case where the battery is in a predetermined low-temperature state, the electric power to be supplied to the thermoelectric conversion element to cause a surface of the thermoelectric conversion element coupled to the battery to serve as a heat dissipation surface and to cause a surface of the thermoelectric conversion element coupled to the electric power conversion device to serve as a heat absorption surface.

MODES FOR CARRYING OUT THE INVENTION

Figure 1:
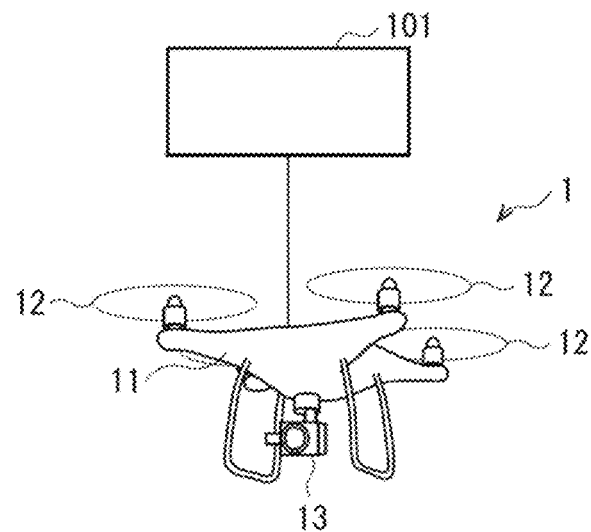
FIG. 1 is an outline diagram schematically illustrating an appearance of a mobile body according to one embodiment of the present disclosure.

The following describes some embodiments of the present disclosure in detail with reference to the drawings. The embodiments described below are specific examples of the present disclosure and are not intended to limit the technology of the present disclosure to the following specific examples. In addition, arrangement, dimensions, and dimension ratios of components in the following embodiments are not limited to the examples illustrated in the drawings.

The description is given in the following order.
1. Basic Configuration
2. Description of Operation
3. Description by Flowcharts
4. Workings and Effects
5. Summary

1. Basic Configuration

FIG. 1 is an outline diagram schematically illustrating an appearance of a mobile body according to an embodiment of the present disclosure (hereinafter, simply referred to as a "mobile body") 1.

The mobile body 1 is a mobile body that is able to fly, i.e. a flying body, specifically a multicopter-type drone. The employable mobile body 1 is not limited to the multicopter-type drone, and may be a drone other than that of the multicopter type, or may be a mobile body other than the flying body, for example, a wheeled or vehicle-type mobile robot.

The mobile body 1 includes a body part 11, and a plurality of rotary wings (i.e., propellers) 12 attached to the body part 11. The mobile body 1 flies by means of buoyancy and thrust generated by the propellers 12. The body part 11 contains an electric motor, a battery, and an inverter, and receives power generated by the electric motor to rotate.

In the present embodiment, a camera 13 is provided as an imaging unit on a bottom surface of the body part 11. The camera 13 is able to acquire an image or a video of an external environment of the mobile body 1, for example, of a region below the mobile body 1. The acquired image or video may be stored in a storage unit provided in the mobile body 1 or transmitted wirelessly to an outside (e.g., a personal computer).

An operation of the mobile body 1 (including the camera 13) is controlled by a control system 101 which will be described later.

Figure 2:
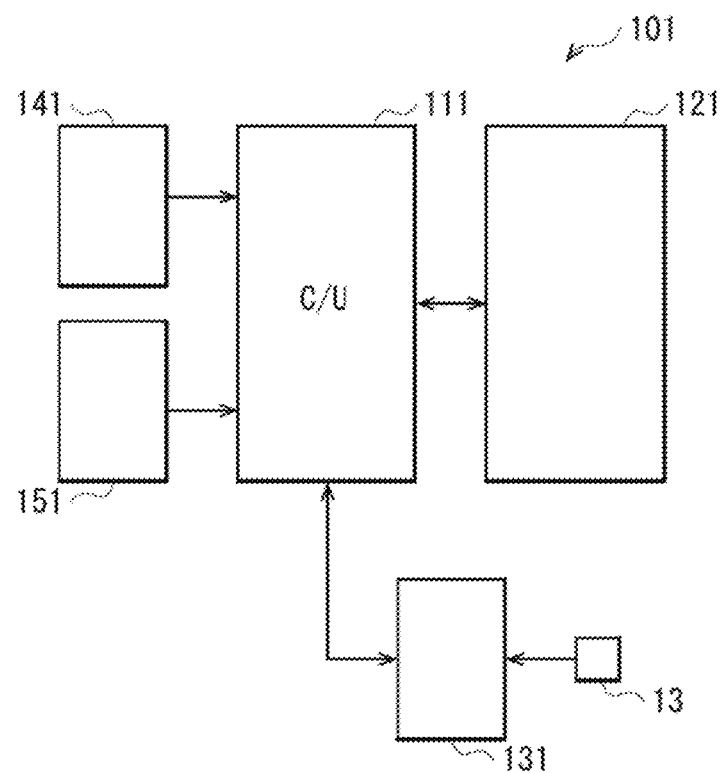
FIG. 2 is an outline diagram illustrating an overall configuration of a control system for the mobile body according to the embodiment.

FIG. 2 is an outline diagram illustrating an overall configuration of the control system 101 for the mobile body 1 according to the present embodiment.

The control system 101 is contained in the body part 11 of the mobile body 1. Roughly speaking, the control system 101 includes a controller 111, a driving unit 121, an analysis unit 131, a route acquisition unit 141, and an information acquisition unit 151.

The controller 111 integrally controls the operation of the mobile body 1. In the present embodiment, in addition to a control related to driving of an electric motor 122, the controller 111 executes a control of managing a temperature of a battery 123 provided in the driving unit 121. In addition, the controller 111 executes a control of performing switching between operating and stopping of the camera 13 described above. Further, in a case of causing the camera 13 to operate, the controller 111 executes a control of switching a direction of the camera 13, a control of performing switching between zoom-up and zoom-out of the camera 13, etc.

The driving unit 121 includes the electric motor 122. The electric motor 122 generates power to drive the propellers 12. A configuration of the driving unit 121 will be described in more detail later.

The analysis unit 131 processes the image or video captured by the camera 13. The processing to be performed by the analysis unit 131 may be to take in the captured image or video and to convert it into a data structure suitable for transmission by wireless communication. The analysis unit 131 may include a transmitter for wireless communication with the outside. The camera 13 may always operate while the mobile body 1 is flying, or may be stopped when the mobile body 1 takes off and caused to operate when the mobile body 1 approaches a target position.

The route acquisition unit 141 acquires information regarding a flight route of the mobile body 1. Specifically, on the basis of route information (e.g., the target position) set by a user and a current position of the mobile body 1, the route acquisition unit 141 identifies a flight route from the current position to the target position, and store information thereof. One of the easiest and simplest examples of the flight route is a shortest route connecting the current position and the target position. Here, in order to avoid a collision with another mobile body flying back from the target position toward the current position, for example, a route from the current position to the target position and a route from the target position to the current position may be set at different altitudes.

The information acquisition unit 151 acquires information regarding a condition influencing the flight of the mobile body 1. Examples of such information may include map information of a region around the flight route. For example, in a case where a building having a height that interferes with the route is present in the middle of the flight route, the information acquisition unit 151 acquires a position and the height of the building on the map, and provides them to the controller 111. The controller 111 is able to correct the flight route (basic route) acquired by the route acquisition unit 141 on the basis of the information provided by the information acquisition unit 151.

Figure 3:
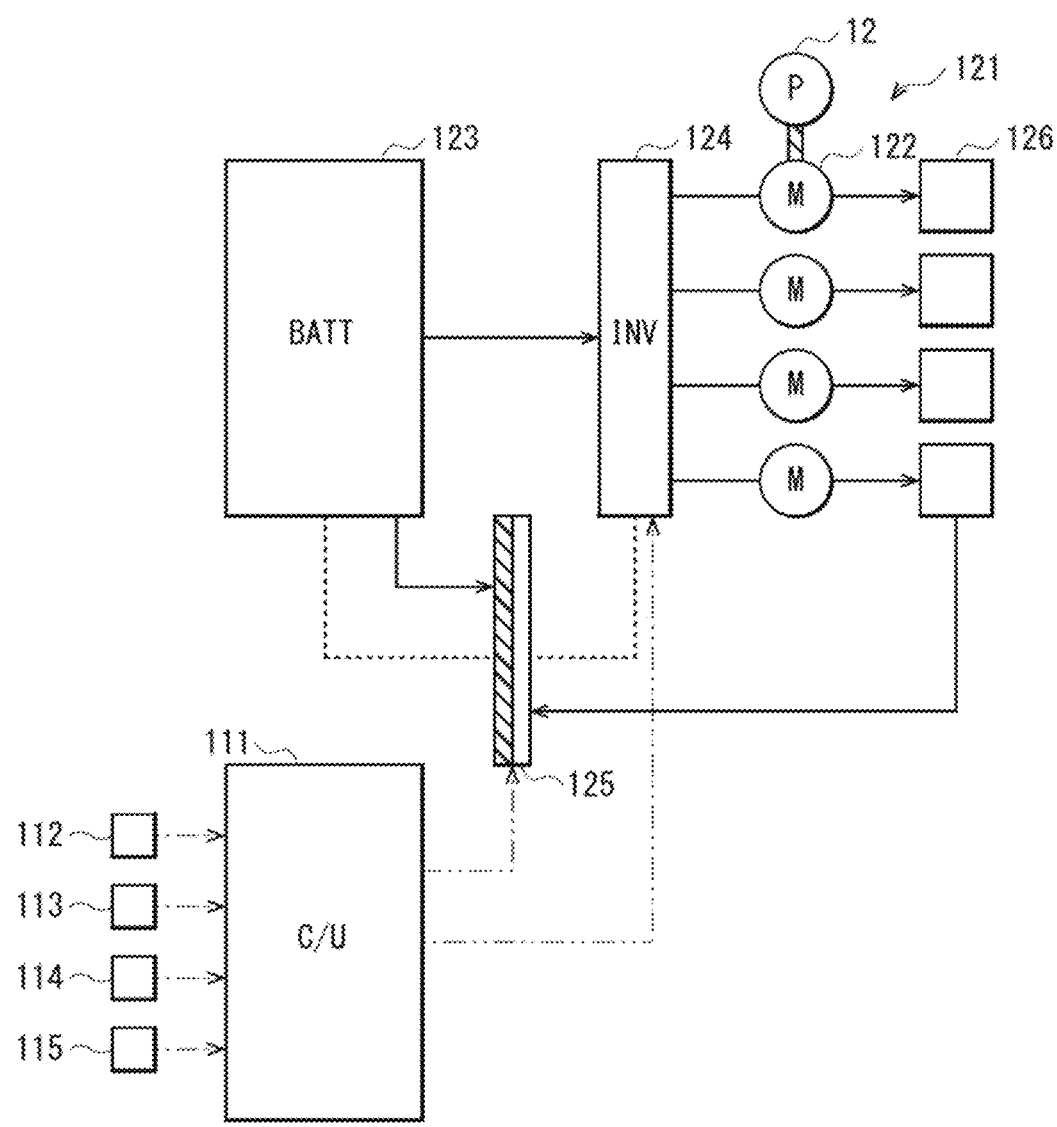
FIG. 3 is an outline diagram illustrating a configuration of a controller and a driving unit of the control system for the mobile body according to the embodiment.

FIG. 3 is an outline diagram illustrating a configuration of the controller 111 and the driving unit 121 of the control system 101 for the mobile body 1 according to the present embodiment.

The controller 111 includes a microcomputer including a central processing unit (hereinafter, sometimes referred to as a "CPU"); various memories including a ROM, a RAM, and the like; an input and output interface; and the like. The controller 111 is able to operate as a "controller" according to the present embodiment by reading out a computer program stored in the RAM and executing it by the CPU. In the present embodiment, various sensors 112 to 115 are provided to detect a current position Xf of the mobile body 1, a temperature Tbtt of the battery 123, a temperature Tinv of the inverter 124, and a temperature Tcpu of the CPU as information to be used in the control performed by the controller 111. The controller 111 receives an input regarding the current position Xf, the battery temperature Tbtt, the inverter temperature Tinv, and the CPU temperature Tcpu detected by the various sensors 112 to 115. Further, the controller 111 executes calculation in accordance with the computer program on the basis of the inputted information, and output a resulting control command to a driving circuit of the inverter 124 and a thermoelectric conversion element 125.

Roughly speaking, the driving unit 121 includes the electric motor 122, the battery 123, and the inverter 124, and also includes the thermoelectric conversion element 125. In the present embodiment, the driving unit 121 includes a regenerative device 126 in addition thereto.

The electric motor 122 is included in a driving source of the mobile body 1 and generates power to be supplied to the propellers 12. In the present embodiment, a plurality of (e.g., four) propellers 12 are provided, and one electric motor 122 is provided for each of the four propellers 12. In the present embodiment, the electric motors 122 and the propellers 12 are in a one-to-one relationship; however, such a configuration is non-limiting. Electric motors 122 less in number than the propellers 12 may be provided, and a configuration may be provided to distribute power from one electric motor 122 to two or more propellers 12.

The battery 123 is a secondary battery configured to store electric power to be supplied to the electric motor 122 and other electrical components. Examples of the employable battery 123 may include a lithium-ion battery. Electric power outputted from the battery 123 is supplied to the electric motor 122 via the inverter 124 and is also suppliable to the thermoelectric conversion element 125.

The inverter 124 is a specific example of an "electric power conversion device" of the present disclosure. The inverter 124 converts the electric power outputted from the battery 123 into driving power for the electric motor 122.

Here, the inverter 124 generates heat while operating to convert the electric power. In the present embodiment, the battery 123 and the inverter 124 are coupled to each other thermally, specifically, the battery 123 and the inverter 124 are coupled to each other in direct contact or in indirect contact with each other with the thermoelectric conversion element 125 interposed therebetween to form a heat transfer path between the battery 123 and the inverter 124. This makes it possible to use the heat generated by the inverter 124 to heat the battery 123.

The thermoelectric conversion element 125 is interposed in the heat transfer path between the battery 123 and the inverter 124 to facilitate heat transfer via this heat transfer path (FIG. 3 schematically illustrates the heat transfer path by a thick dotted line). The employable thermoelectric conversion element 125 is, for example, a Peltier element. Under the control by the controller 111, the thermoelectric conversion element 125 is configured to cause a surface coupled to the battery 123 to serve as a heat dissipation surface and to cause a surface coupled to the inverters 124 as a heat absorption surface. It is also possible to apply a voltage having a polarity opposite to this to the thermoelectric conversion element 125 to reverse the heat dissipation surface and the heat absorption surface, i.e., to cause the battery 123 side to serve as the heat absorption surface and to cause the inverter 124 side to serve as the heat dissipation surface.

In the present embodiment, as will be described later, the battery 123 and the inverter 124 are disposed close to each other and are closely attached to each other with the thermoelectric conversion element 125 interposed therebetween. In other words, the battery 123 is disposed in contact with one surface of the thermoelectric conversion element 125, and the inverter 124 is disposed in contact with another surface (e.g., a heat absorption surface 125b in a case where the one surface serves as a heat dissipation surface 125a) of the thermoelectric conversion element 125. Here, "in contact with" not limitedly means a case of being in direct contact but also encompasses a case where a member having a heat transfer property or a member provided to facilitate heat transfer is interposed in between. Such members may be, for example, a heat dissipation material or a heat dissipation sheet. In other words, "in contact with" encompasses a state in which the battery 123 and the inverter 124 are in indirect contact with each other. The battery 123 may be in contact with the one surface of the thermoelectric conversion element 125 not only at a side surface of an enclosure or a housing of the battery 123 but also at a side surface of an assembled battery or a battery module contained in the enclosure.

The regenerative device 126 performs a regenerative operation that converts kinetic energy of the propellers 12 into electric energy. Electric power generated by regeneration may be used to charge the battery 123 or may be supplied to the thermoelectric conversion element 125. The regenerative operation may be performed by a device dedicated for regeneration, such as the regenerative device 126. Alternatively, in a case where the electric motor 122 itself has a regenerative function, for example, in a case where the electric motor 122 is configured to operate as a motor generator, the regenerative device 126 is omittable.

The electric motor 122, the battery 123, the inverter 124, and the thermoelectric conversion element 125 correspond to specific examples of an "electric motor", a "battery", an "electric power conversion device", and a "thermoelectric conversion element" of the present disclosure, respectively, and the controller 111 corresponds to a specific example of a "controller" of the present disclosure. Here, for example, the controller 111, the driving unit 121, and the propellers 12 are included in a "mobile body" of the present disclosure. Further, for example, the battery 123, the inverter 124, the thermoelectric conversion element 125, and the controller 111 are included in an "electric power supply system" of the present disclosure.

2. Description of Operation

The following describes an operation of the mobile body 1 according to the present embodiment, mainly an operation related to a temperature control for the battery 123.

Figure 4:
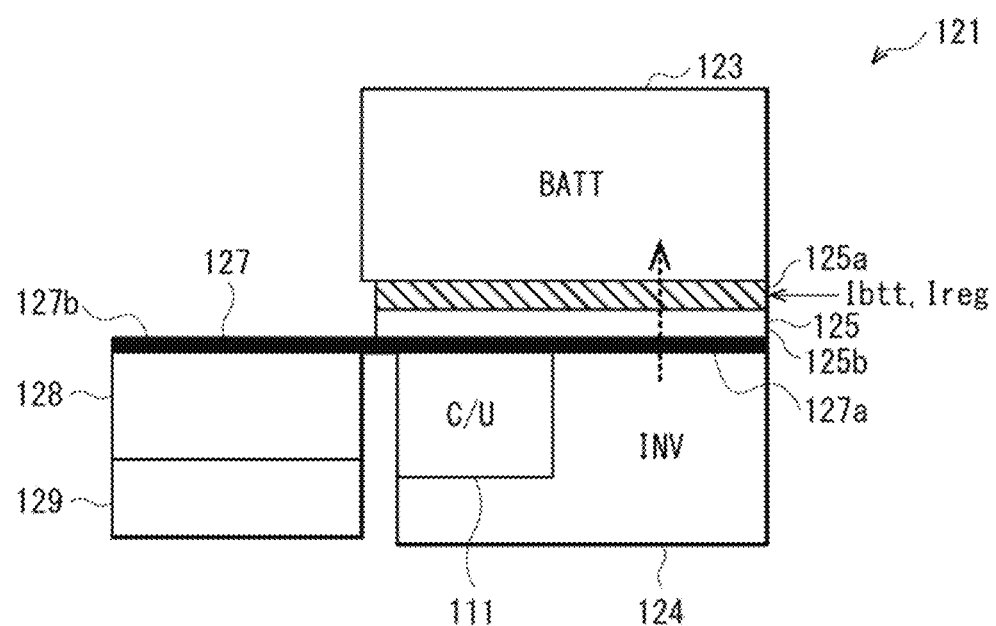
FIG. 4 is an explanatory diagram illustrating an operation of the driving unit according to the embodiment in a low-temperature case.

FIG. 4 is an explanatory diagram illustrating an operation to be performed by the driving unit 121 according to the present embodiment when the temperature of the battery 123 is low.

In the present embodiment, in addition to the configuration of the driving unit 121 described above, a heat pipe 127, a heat sink 128, and a cooling fan 129 are further provided. Here, before describing the operation, these additional configurations are described.

The heat pipe 127 is a specific example of a "heat transfer material" of the present disclosure. The heat pipe 127 includes a heat medium enclosed therein. The heat medium undergoes a phase change in accordance with reception and transfer of heat. The heat pipe 127 delivers heat from a high-temperature part 127a on one side that is an evaporation side to a low-temperature part 127b on another side that is a condensation side. In the present embodiment, the high-temperature part 127a of the heat pipe 127 is interposed between the inverter 124 and the thermoelectric conversion element 125. That is, the battery 123 is directly in contact with the one surface of the thermoelectric conversion element 125. The inverter 124 is indirectly in contact with the other surface of the thermoelectric conversion element 125 (e.g., the heat absorption surface 125b in a case where the one surface serves as the heat dissipation surface 125a) with the high-temperature part 127a of the heat pipe 127 interposed therebetween.

The heat sink 128 serves as a heat dissipation facilitating material and is thermally coupled to the low-temperature part 127b of the heat pipe 127. The heat sink 128 facilitates discharging of heat of the heat medium of the heat pipe 127 to an outside of the heat pipe 127. In the present embodiment, the heat sink 128 is brought into contact with the heat pipe 127.

The cooling fan 129 forms a cooling air for facilitating cooling of the entire driving unit 121. In the present embodiment, the cooling fan 129 is so disposed that the cooling air hits the heat sink 128. The cooling fan 129 facilitates heat dissipation from the heat sink 128 and heat transfer via the heat pipe 127 to thereby facilitate cooling of the driving unit 121, especially, of the battery 123 and the inverter 124.

Figure 5:
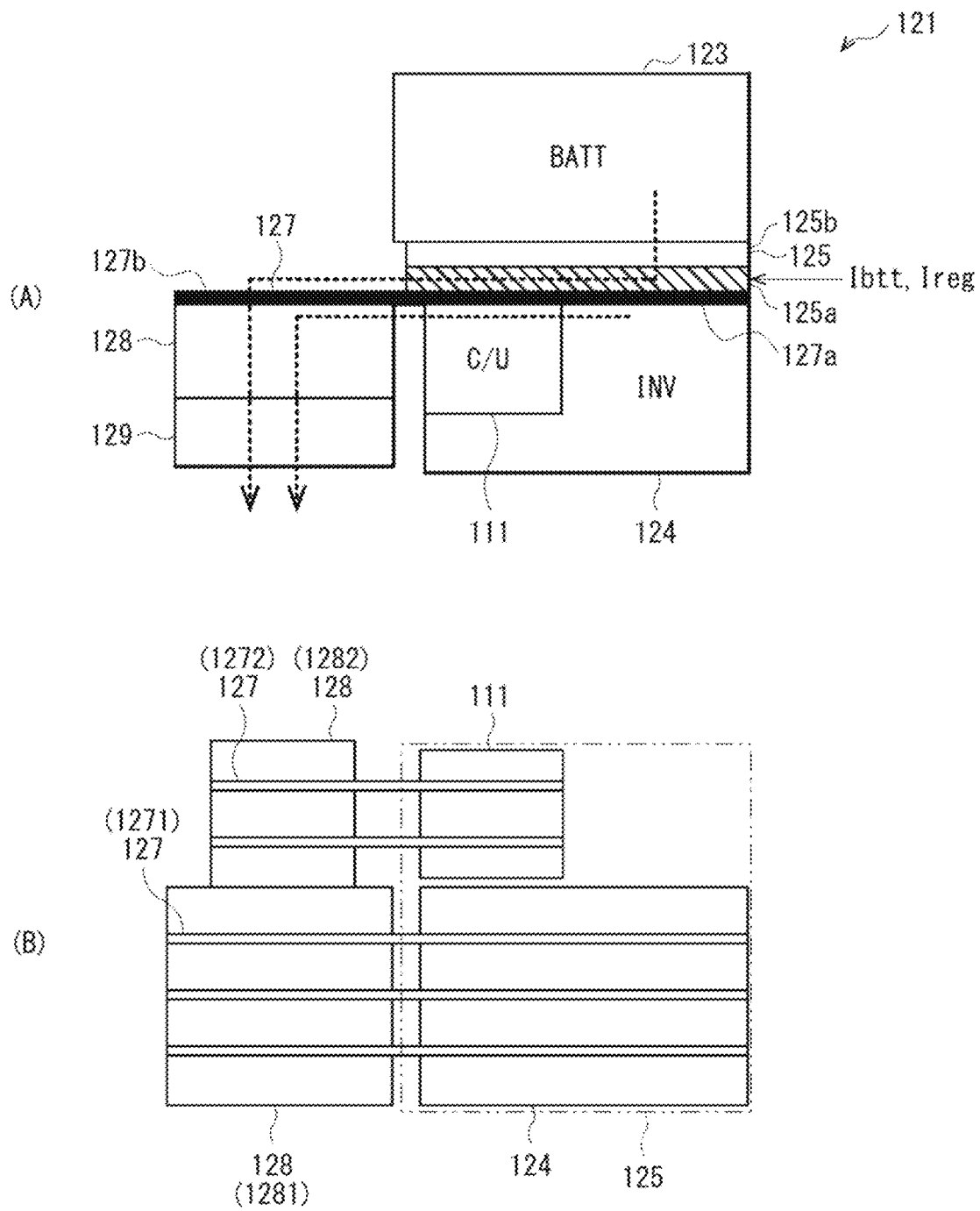
FIG. 5 is an explanatory diagram illustrating an operation of the driving unit according to the embodiment in a high-temperature case.

When the temperature of the battery 123 is low, electric power is so supplied to the thermoelectric conversion element 125 that the one surface in contact with the battery 123 serves as the heat dissipation surface 125a and the other surface in contact with the inverter 124 serves as the heat absorption surface 125b. This facilitates heat transfer from the inverter 124 to the battery 123, making it possible to heat the battery 123 while cooling the inverter 124. FIG. 4 and FIG. 5 to be described next schematically illustrate the heat transfer by a thick dotted line with an arrow.

FIG. 5 is an explanatory diagram illustrating an operation to be performed by the driving unit 121 according to the present embodiment when the temperature of the battery 123 is high. (A) of FIG. 5 schematically illustrates, in a side view, a relationship among components included in the driving unit 121. (B) of FIG. 5 schematically illustrates, in a plan view, a relationship especially among the controller 111, the inverter 124, the thermoelectric conversion element 125, the heat pipe 127, and the heat sink 128 of the components included in the driving unit 121. In the present embodiment, as illustrated in (B) of FIG. 5, the heat sink 128 for the controller 111 and the heat sink 128 for the inverter 124 are provided separately. That is, in addition to a first heat sink 1281 for facilitating heat dissipation from the inverter 124, a second heat sink 1282 is provided for facilitating heat dissipation from the controller 111 (the CPU). The inverter 124 and the first heat sink 1281 are coupled to each other by a first heat pipe 1271. The controller 111 and the second heat sink 1282 are coupled to each other by a second heat pipe 1272. In the present embodiment, it is thus possible to perform cooling of the inverter 124 by the first heat sink 1281 and cooling of the controller 111 by the second heat sink 1282 independently of each other. The cooling fan 129 is provided for each of the first heat sink 1281 and the second heat sink 1282.

When the temperature of the battery 123 is high, electric power is so supplied to the thermoelectric conversion element 125 that the one surface in contact with the battery 123 serves as the heat absorption surface 125b and the other surface in contact with the inverter 124 and the controller 111 serves as the heat dissipation surface 125a. This increases a difference in temperature between the high-temperature part 127a and the low-temperature part 127b, facilitating the phase change of the heat medium inside the heat pipe 127. Accordingly, it is possible to facilitate heat delivery via the heat pipe 127. As a result, heat absorbed by the thermoelectric conversion element 125 from the battery 123 is allowed to be dissipated via the heat pipe 127, while heat of the inverter 124 is allowed to be dissipated by the first heat sink 1281 via the first heat pipe 1271, and heat of the controller 111 is allowed to be dissipated by the second heat sink 1282 via the second heat pipe 1272. This makes it possible to facilitate cooling of both the battery 123 and the inverter 124 and also to facilitate cooling of both the battery 123 and the controller 111. It is possible to perform cooling of the controller 111, the battery 123, and the inverter 124 as a whole.

3. Description by Flowcharts

Figure 6:
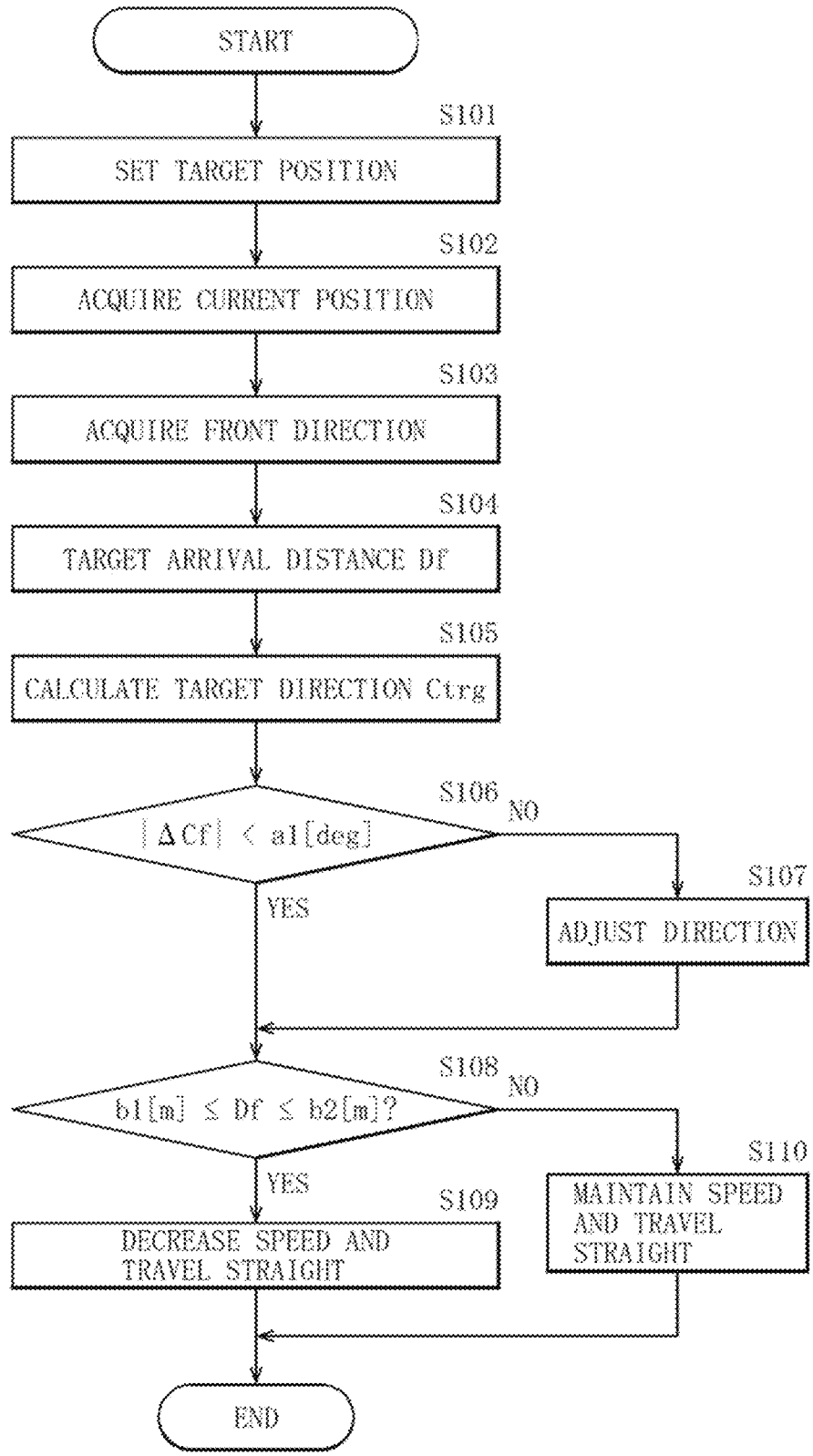
FIG. 6 is a flowchart illustrating contents of a drive control routine to be executed by the controller according to the embodiment while the mobile body is flying.

FIG. 6 is a flowchart describing contents of a drive control routine to be executed by the controller 111 according to the present embodiment while the mobile body 1 is flying. This routine is executed by the controller 111 in a predetermined cycle.

In S101, the controller 111 sets the target position Xtrg of the mobile body 1.

In S102, the controller 111 acquires the current position Xf of the mobile body 1.

In S103, the controller 111 acquires a front direction of the mobile body 1, i.e. a direction Cf in which a nose of the mobile body 1 is directed.

In S104, the controller 111 calculates a flight distance (hereinafter, referred to as a "target arrival distance") Df from the current position Xf to the target position Xtrg. The target arrival distance Df may be calculated from the flight route and the map information.

In S105, the controller 111 calculates a target direction of the mobile body 1, i.e., a direction Ctrg in which the nose of the mobile body 1 is to be directed at a current timing in a case where the mobile body 1 flies from the current position Xf toward the target position Xtrg. The target direction Ctrg may be calculated from the flight route and the map information. However, in a case where the mobile body 1 flies linearly from the current position Xf toward the target position Xtrg, the target direction Ctrg may be a direction of a straight line connecting the current position Xf and the target position Xtrg on the map.

In S106, the controller 111 calculates an error ΔCf (=Cf−Ctrg) of the front direction Cf with respect to the target direction Ctrg, and determines whether or not an absolute value of the calculated error ΔCf is less than a predetermined value a [deg]. In a case where the absolute value of the error ΔCf is less than the predetermined value a, the process proceeds to S108. In a case where the absolute value of the error ΔCf is greater than or equal to the predetermined value a, the process proceeds to S107.

In S107, the controller 111 adjusts the front direction Cf in accordance with the error ΔCf. Specifically, in a case where the front direction Cf involves a deviation with respect to the target direction Ctrg that exceeds a range defined by the predetermined value a, the controller 111 so adjusts the direction of the mobile body 1 that the front direction Cf becomes closer to the target direction Ctrg. In contrast, in a case where the front direction Cf does not involve such a deviation, the controller 111 allows the flight to continue while maintaining the current direction.

In S108, the controller 111 determines whether or not the target arrival distance Df falls within a range defined by predetermined values b1 and b2, specifically, within a range of greater than or equal to the predetermined value b1 [m] and less than or equal to the predetermined value b2 [m]. In a case where the target arrival distance Df falls within the range of greater than or equal to the predetermined value b1 and less than or equal to the predetermined value b2, the controller 111 assumes that the mobile body 1 is approaching the target position Xtrg, and the process proceeds to S109. In a case where the target arrival distance Df does not fall within this range, the controller 111 assumes that there is still a distance left before reaching the target position Xtrg, and the process proceeds to S110.

In S109, the controller 111 causes the mobile body 1 to travel straight while decreasing the speed of the mobile body 1.

In S110, the controller 111 causes the mobile body 1 to travel straight while maintaining a current speed.

Figure 7:
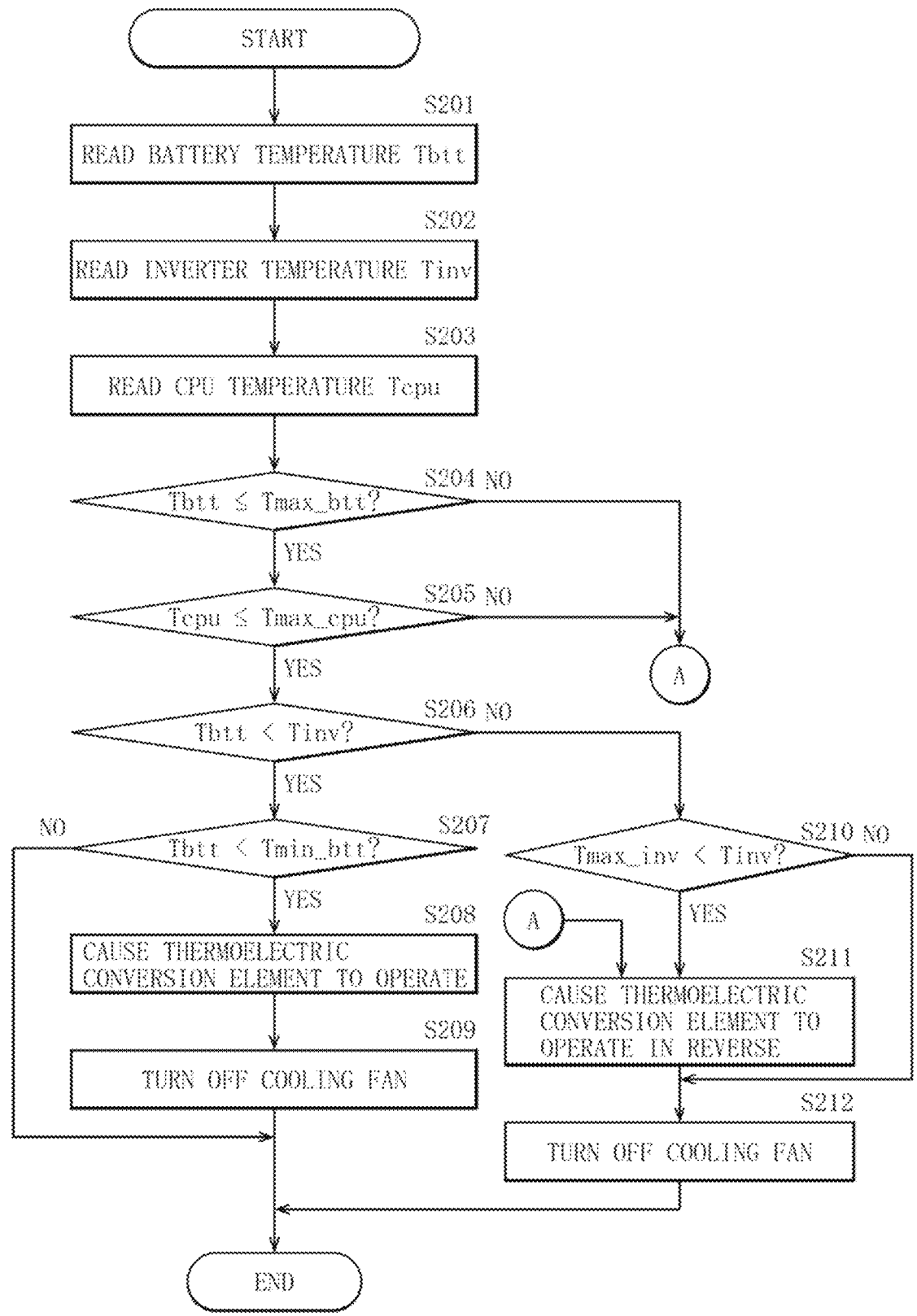
FIG. 7 is a flowchart illustrating contents of a temperature control routine to be executed by the controller according to the embodiment.

FIG. 7 is a flowchart describing contents of a temperature control routine to be executed by the controller 111 according to the present embodiment. This routine is executed by the controller 111 in a cycle longer than that of the drive control routine.

In S201, the controller 111 reads the battery temperature Tbtt.

In S202, the controller 111 reads the inverter temperature Tinv.

In S203, the controller 111 reads the CPU temperature Tcpu.

In S204, the controller 111 determines whether or not the battery temperature Tbtt is lower than or equal to an allowable upper-limit temperature Tmax_btt of the battery 123. In a case where the battery temperature Tbtt is lower than or equal to the allowable upper-limit temperature Tmax_btt, the process proceeds to S205. In a case where the battery temperature Tbtt exceeds the allowable upper-limit temperature Tmax_btt, the process proceeds to S211.

In S205, the controller 111 determines whether or not the CPU temperature Tcpu is lower than or equal to an allowable upper-limit temperature Tmax_cpu of the CPU included in the controller 111. In a case where the CPU temperature Tcpu is lower than or equal to the allowable upper-limit temperature Tmax_cpu, the process proceeds to S206. In a case where the CPU temperature Tcpu exceeds the allowable upper-limit temperature Tmax_cpu, the process proceeds to S211.

As described above, in a case where the battery temperature Tbtt exceeds the allowable upper-limit temperature Tmax_btt of the battery 123 or where the CPU temperature Tcpu exceeds the allowable upper-limit temperature Tmax_cpu of the CPU, i.e., in a case where the temperature of at least one of the battery 123 or the CPU rises excessively, the controller 111 causes the driving unit 121 to operate in a second state illustrated in FIG. 5 to facilitate cooling of the entire driving unit 121. The second state is an operation state in which the surface of the thermoelectric conversion element 125 coupled to the battery 123 serves as the heat absorption surface and the surface of the thermoelectric conversion element 125 coupled to the inverter 124 serves as the heat dissipation surface.

In S206, the controller 111 determines whether or not the battery temperature Tbtt is lower than the inverter temperature Tinv. In a case where the battery temperature Tbtt is lower than the inverter temperature Tinv, the process proceeds to S207. In a case where the battery temperature Tbtt is higher than or equal to the inverter temperature Tinv, the process proceeds to S210.

In S207, the controller 111 determines whether or not the battery temperature Tbtt is lower than an allowable lower-limit temperature Tmin_btt of the battery 123. In a case where the battery temperature Tbtt is lower than the allowable lower-limit temperature Tmin_btt, the process proceeds to S208. In a case where the battery temperature Tbtt is higher than or equal to the allowable lower-limit temperature Tmin_btt, the controller 111 ends the control performed by the present routine.

In S208, the controller 111 causes the driving unit 121 to operate in a first state illustrated in FIG. 4. The first state is an operation state in which the surface of the thermoelectric conversion element 125 coupled to the battery 123 serves as the heat dissipation surface and the surface of the thermoelectric conversion element 125 coupled to the inverter 124 serves as the heat absorption surface. This facilitates heat transfer from the inverter 124 to the battery 123, thus heating the battery 123 while colling the inverter 124.

In S209, the controller 111 stops the cooling fan 129, and thereafter ends the control performed by the present routine.

In S210, the controller 111 determines whether or not the inverter temperature Tinv exceeds an allowable upper-limit temperature Tmax_inv of the inverter 124. In a case where the inverter temperature Tinv exceeds the allowable upper-limit temperature Tmax_inv, the process proceeds to S211. In a case where the inverter temperature Tinv is lower than or equal to the allowable upper-limit temperature Tmax_inv, the controller 111 stops electric power supply to the thermoelectric conversion element 125, and the process proceeds to S212. In a case where the electric power supply is stopped, the thermoelectric conversion element 125 does not become a major obstruction of heat transfer and serves as a portion of the heat transfer path.

In S211, the controller 111 causes the driving unit 121 to operate in the second state illustrated in FIG. 5.

In S212, the controller 111 causes the cooling fan 129 to operate, and thereafter ends the control performed by the present routine.

As described above, in a case where the battery temperature Tbtt is lower than the inverter temperature Tinv and is lower than the allowable lower-limit temperature Tmin_btt of the battery 123, the driving unit 121 is caused to operate in the first state, to thereby achieve both heating of the battery 123 and cooling of the inverter 124 together. In contrast, in a case where the inverter temperature Tinv is lower than the battery temperature Tbtt (in other words, the battery temperature Tbtt is higher) and exceeds the allowable upper-limit temperature Tmax_inv of the inverter 124, the driving unit 121 is caused to operate in the second state, to thereby cool both the battery 123 and the inverter 124.

4. Workings and Effects

Due to temperature dependence in terms of an operation of a secondary battery such as a lithium-ion battery, charging and discharging efficiency decreases in a low-temperature environment; whereas a self-discharge amount increases and residual capacity decreases markedly in a high-temperature environment. For a flight in a low-temperature environment such as in a cold region, a flying body such as a drone may decrease in charging and discharging efficiency of the battery and have difficulty in obtaining a sufficient output from an electric motor which is a driving source. This may make flight unstable, and also, shorten a flight time. To address the decrease in charging and discharging efficiency of the battery, the heat retention system disclosed in PTL 1 described above uses an electric heater provided as a heat source exclusively to heat the battery. Therefore, in a case where the battery and an inverter are disposed close to each other, it is difficult to sufficiently suppress heat transfer from the electric heater to the inverter, which may result in heating of the inverter that, in fact, requires cooling. In addition, in a case of using an electric heater, there is another concern that the operation of the electric heater consumes electric power of the battery. Japanese Unexamined Patent Application Publication No. 2011-192749 discloses a temperature adjustment device using a Peltier element. This temperature adjustment device uses the Peltier element to cool the inverter. Thus, no consideration is given to the issue related to the temperature dependence of the battery.

In the present embodiment, the thermoelectric conversion element 125 allows the heating of the battery 123 and the cooling of the inverter 124 to be achieved together. This makes it possible to favorably manage both the temperature of the battery 123 and the temperature of the inverter 124, and especially, to quickly increase and maintain the temperature of the battery 123 upon the operation in a low-temperature environment. It is thereby possible to suppress the occurrence of insufficiency in the output of the electric motor 122.

Here, disposing the battery 123 and the inverter 124 close to each other enables to reduce a space required for mounting the battery 123 and the peripheral equipment thereof, and to thereby efficiently mount them on the mobile body 1 having a relatively small size.

In addition, the configuration in which the heat generated by the inverter 124, i.e., the heat discharged from the inverter 124, is used to heat the battery 123 makes it possible to obtain the above-described effects while suppressing electric power consumption.

Further, allowing the battery 123 and the inverter 124 to be disposed close to each other makes it possible to reduce the size of the mobile body 1 as a whole by reducing the mounting space, and also makes it possible to reduce the loss in the heat transfer from the inverter 124 to the battery 123.

In addition, it also allows for omitting the components (e.g., an electrolytic capacitor for suppressing LC resonance caused by parasitic inductance of the wiring) by minimizing the length of the wiring between the battery 123 and the inverter 124, thereby simplifying the filter circuit or reducing the size thereof. As a result, it is possible to reduce the weight of the mobile body 1, and in a case of employing a flying body such as a drone as the mobile body 1, it is possible to reduce the load on the electric motor 122 during the flight and to thereby extend the flight time of the mobile body 1.

In addition, allowing the electric motor 122 not only to perform power running but also to perform regeneration by providing the regenerative device 126 or the like makes it possible to supply the electric power generated by the regeneration to the thermoelectric conversion element 125. This makes it possible to suppress electric power consumption in the entire control system 101 for the mobile body 1, and to thereby extend the flight time.

5. Summary

Some embodiments according to the present disclosure have been described above in detail with reference to the drawings. According to the embodiments of the present disclosure, a thermoelectric conversion element allows heating of a battery and cooling of an electric power conversion device such as an inverter to be achieved together. This suppresses an influence of the heating of the battery on the electric power conversion device, and makes it possible to favorably manage both the temperature of the battery and the temperature of the electric power conversion device. In addition, the configuration in which the heat generated by the electric power conversion device, for example, the heat discharged from the inverter, is used to heat the battery makes it possible to obtain the above-described effects while suppressing electric power consumption.

The technology of the present disclosure is not limited to the above-described specific examples, and may have various modifications and combinations of such modifications. In the description above, a flying body, specifically, a multicopter-type drone, is used as the mobile body. However, the employable mobile body is not limited thereto, and may be a drone other than that of the multicopter type. In addition, as a mobile body other than the flying body, a wheeled or vehicle-type mobile body such as an electric personal mobility or an automatic guided vehicle (AGV) may be employed.

Furthermore, not all the configurations and the operations described in each of the embodiments are essential to the configurations and the operations of the present disclosure. For example, among the components in each of the embodiments, components not described in the independent claims describing the most superordinate concept of the present disclosure should be understood as optional components.

The terms used throughout the specification and the appended claims should be construed as "non-limiting" terms. For example, the terms "include" or "be included" should be construed as "not limited to the example described with the term included". The term "have" should be construed as "not limited to the example described with the term have".

The terms used herein include some terms that are used merely for convenience of description and are not used to limit the configuration, the operation, and the like. For example, the term such as "right," "left," "upper," or "lower" merely indicates a direction on the referred drawing.

Further, the terms "inner", "outer", and the like merely indicate a direction toward the center of the component of interest and a direction away from the center of the component of interest, respectively. This similarly applies to terms similar to the above-described terms and terms having similar meanings.

The technology according to the present disclosure may have the following configurations. According to the technology of the present disclosure having the following configurations, the thermoelectric conversion element allows heating of the battery and cooling of the electric power conversion device to be achieved together. This makes it possible to favorably manage both the temperature of the battery and the temperature of the electric power conversion device. Effects exerted by the technology according to the present disclosure are not necessarily limited to the effects described here, and may be any of the effects described herein.

(1)

A mobile body including:

an electric motor that is a driving source;

a battery;

a thermoelectric conversion element;

an electric power conversion device configured to convert electric power outputted from the battery into driving electric power for the electric motor, the electric power conversion device being disposed in direct contact or in indirect contact with the battery with the thermoelectric conversion element interposed therebetween; and a controller configured to control electric power to be supplied to the thermoelectric conversion element, in which the controller controls, in a case where the battery is in a predetermined low-temperature state, the electric power to be supplied to cause a surface of the thermoelectric conversion element coupled to the battery to serve as a heat dissipation surface and to cause a surface of the thermoelectric conversion element coupled to the electric power conversion device to serve as a heat absorption surface.

(2)

The mobile body according to (1) described above, in which the battery is disposed in contact with the heat dissipation surface of the thermoelectric conversion element, and the electric power conversion device is disposed in contact with the heat absorption surface of the thermoelectric conversion element.

(3)

The mobile body according to (1) or (2) described above, further including a temperature sensor configured to detect a temperature of the battery, in which the controller controls the electric power to be supplied on the basis of the temperature detected by the temperature sensor.

(4)

The mobile body according to any one of (1) to (3) described above, in which the controller stops supply of the electric power in a case where the battery is in a predetermined high-temperature state.

(5)

The mobile body according to (4) described above, further including a cooling fan configured to cool the battery and the electric power conversion device, in which the controller is configured further to cause the cooling fan to operate in a case where the battery is in the predetermined high-temperature state.

(6)

The mobile body according to any one of (1) to (5) described above, further including a heat transfer material having a low-temperature part on one side and a high-temperature part on another side, the high-temperature part being interposed between the electric power conversion device and the thermoelectric conversion element, in which the controller controls, in a case where the battery is in the predetermined high-temperature state, the electric power to be supplied to cause the surface of the thermoelectric conversion element coupled to the battery to serve as the heat absorption surface and to cause the surface of the thermoelectric conversion element coupled to the electric power conversion device to serve as the heat dissipation surface.

(7)

The mobile body according to any one of (1) to (6) described above, in which the controller is configured further to switch an operation state of the electric motor between a power running operation and a regenerative operation, and to supply electric power generated by the electric motor by the regenerative operation to the thermoelectric conversion element.

(8)

The mobile body according to any one of (1) to (7) described above, further including:

a body part containing the electric motor and the electric power conversion device; and a rotary wing attached to the body part, the rotary wing being configured to operate using the electric motor as the driving source and to generate buoyancy for the mobile body.

(9)

A method of controlling a mobile body, the method including:

converting electric power from a battery to predetermined output electric power by an electric power conversion device, the electric power conversion device being disposed in direct contact or in indirect contact with the battery with a thermoelectric conversion element interposed therebetween;

supplying the output electric power after conversion to an electric motor that is a driving source; and controlling electric power to be supplied to the thermoelectric conversion element, in which the controlling the electric power to be supplied includes, in a case where the battery is in a predetermined low-temperature state, supplying the electric power to the thermoelectric conversion element to cause a surface of the thermoelectric conversion element coupled to the battery to serve as a heat dissipation surface and to cause a surface of the thermoelectric conversion element coupled to the electric power conversion device to serve as a heat absorption surface.

(10)

A program of controlling a mobile body, the program including causing a computer to operate to convert electric power from a battery to driving electric power for an electric motor by an electric power conversion device, the electric motor being a driving source, the electric power conversion device being disposed in direct contact or in indirect contact with the battery with a thermoelectric conversion element interposed therebetween, and control electric power to be supplied to the thermoelectric conversion element, in which to control the electric power to be supplied includes, in a case where the battery is in a predetermined low-temperature state, to cause the electric power to be supplied to the thermoelectric conversion element to cause a surface of the thermoelectric conversion element coupled to the battery to serve as a heat dissipation surface and to cause a surface of the thermoelectric conversion element coupled to the electric power conversion device to serve as a heat absorption surface.

(11)

An electric power supply system including:

a battery;

a thermoelectric conversion element;

an electric power conversion device configured to convert electric power from the battery into predetermined output electric power, the electric power conversion device being disposed in direct contact or in indirect contact with the battery with the thermoelectric conversion element interposed therebetween; and a controller configured to control electric power to be supplied to the thermoelectric conversion element, in which the controller controls, in a case where the battery is in a predetermined low-temperature state, the electric power to be supplied to cause a surface of the thermoelectric conversion element coupled to the battery to serve as a heat dissipation surface and to cause a surface of the thermoelectric conversion element coupled to the electric power conversion device to serve as a heat absorption surface.

This application claims the priority on the basis of Japanese Patent Application No. 2020-095046 filed on May 29, 2020 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A mobile body comprising:
an electric motor that is a driving source;
a battery;
a thermoelectric conversion element;
an electric power conversion device configured to convert electric power outputted from the battery into driving electric power for the electric motor, the electric power conversion device being disposed in direct contact or in indirect contact with the battery with the thermoelectric conversion element interposed therebetween; and
a controller configured to control electric power to be supplied to the thermoelectric conversion element, wherein
the controller controls, in a case where the battery is in a predetermined low-temperature state, the electric power to be supplied to cause a surface of the thermoelectric conversion element coupled to the battery to serve as a heat dissipation surface and to cause a surface of the thermoelectric conversion element coupled to the electric power conversion device to serve as a heat absorption surface.

2. The mobile body according to claim 1, wherein the battery is disposed in contact with the heat dissipation surface of the thermoelectric conversion element, and the electric power conversion device is disposed in contact with the heat absorption surface of the thermoelectric conversion element.

3. The mobile body according to claim 1, further comprising
a temperature sensor configured to detect a temperature of the battery, wherein the controller controls the electric power to be supplied on a basis of the temperature detected by the temperature sensor.

4. The mobile body according to claim 1, wherein the controller stops supply of the electric power in a case where the battery is in a predetermined high-temperature state.

5. The mobile body according to claim 4, further comprising
a cooling fan configured to cool the battery and the electric power conversion device, wherein
the controller is configured further to cause the cooling fan to operate in a case where the battery is in the predetermined high-temperature state.

6. The mobile body according to claim 1, further comprising
a heat transfer material having a low-temperature part on one side and a high-temperature part on another side, the high-temperature part being interposed between the electric power conversion device and the thermoelectric conversion element, wherein
the controller controls, in a case where the battery is in the predetermined high-temperature state, the electric power to be supplied to cause the surface of the thermoelectric conversion element coupled to the battery to serve as the heat absorption surface and to cause the surface of the thermoelectric conversion element coupled to the electric power conversion device to serve as the heat dissipation surface.

7. The mobile body according to claim 1, wherein the controller is configured further to switch an operation state of the electric motor between a power running operation and a regenerative operation, and to supply electric power generated by the regenerative operation to the thermoelectric conversion element.

8. The mobile body according to claim 1, further comprising:
a body part containing the electric motor and the electric power conversion device; and
a rotary wing attached to the body part, the rotary wing being configured to operate using the electric motor as the driving source and to generate buoyancy for the mobile body.

9. A method of controlling a mobile body, the method comprising:
converting electric power from a battery to predetermined output electric power by an electric power conversion device, the electric power conversion device being disposed in direct contact or in indirect contact with the battery with a thermoelectric conversion element interposed therebetween;
supplying the output electric power after conversion to an electric motor that is a driving source; and
controlling electric power to be supplied to the thermoelectric conversion element, wherein
the controlling the electric power to be supplied includes, in a case where the battery is in a predetermined low-temperature state, supplying the electric power to the thermoelectric conversion element to cause a surface of the thermoelectric conversion element coupled to the battery to serve as a heat dissipation surface and to cause a surface of the thermoelectric conversion element coupled to the electric power conversion device to serve as a heat absorption surface.

10. A program of controlling a mobile body, the program comprising
causing a computer to operate to
convert electric power from a battery to driving electric power for an electric motor by an electric power conversion device, the electric motor being a driving source, the electric power conversion device being disposed in direct contact or in indirect contact with the battery with a thermoelectric conversion element interposed therebetween, and
control electric power to be supplied to the thermoelectric conversion element, wherein
to control the electric power to be supplied includes, in a case where the battery is in a predetermined low-temperature state, to cause the electric power to be supplied to the thermoelectric conversion element to cause a surface of the thermoelectric conversion element coupled to the battery to serve as a heat dissipation surface and to cause a surface of the thermoelectric conversion element coupled to the electric power conversion device to serve as a heat absorption surface.

11. An electric power supply system comprising:
a battery;
a thermoelectric conversion element;
an electric power conversion device configured to convert electric power from the battery into predetermined output electric power, the electric power conversion device being disposed in direct contact or in indirect contact with the battery with the thermoelectric conversion element interposed therebetween; and
a controller configured to control electric power to be supplied to the thermoelectric conversion element, wherein
the controller controls, in a case where the battery is in a predetermined low-temperature state, the electric power to be supplied to cause a surface of the thermoelectric conversion element coupled to the battery to serve as a heat dissipation surface and to cause a surface of the thermoelectric conversion element coupled to the electric power conversion device to serve as a heat absorption surface.

* * * * *